No. 792,444. PATENTED JUNE 13, 1905.
R. L. NEWELL.
HARNESS SUPPORT.
APPLICATION FILED SEPT. 20, 1904.
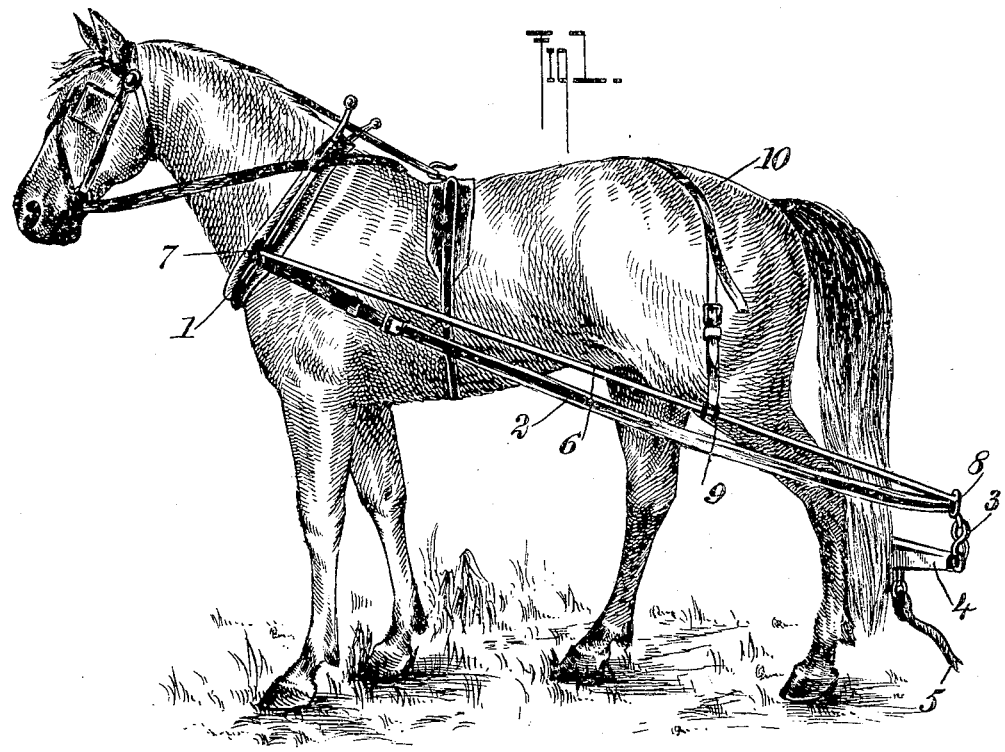
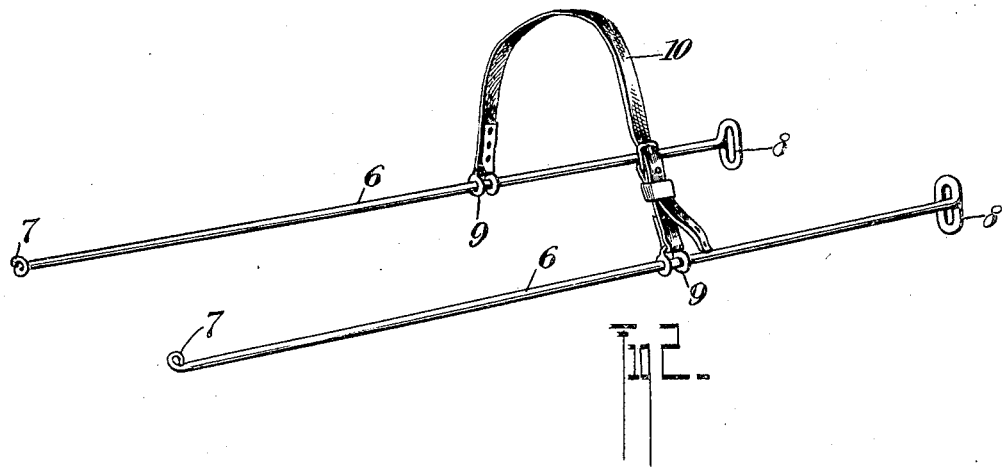
WITNESSES:
INVENTOR
Robert L. Newell
BY
ATTORNEYS No. 792,444. Patented June 13, 1905.

UNITED STATES PATENT OFFICE.

ROBERT LINCOLN NEWELL, OF KEITHSBURG, ILLINOIS.

HARNESS-SUPPORT.

SPECIFICATION forming part of Letters Patent No. 792,444, dated June 13, 1905.

Application filed September 20, 1904. Serial No. 225,228.

*To all whom it may concern:*

Be it known that I, ROBERT LINCOLN NEWELL, a citizen of the United States, and a resident of Keithsburg, in the county of Mercer and State of Illinois, have invented a new and Improved Harness-Support, of which the following is a full, clear, and exact description.

This invention relates to harness, and is especially useful in its connection where the pulling force is exerted intermittently, such as in the raising of ice, the stacking of hay, scraping, plowing, and under various other circumstances.

The object of the invention is to provide an arrangement for supporting the rear portion of the harness, and especially the swingletree and traces, when the pulling force is not being exerted in order to prevent the swingletree and its contiguous parts from striking against the horse's rear limbs or the ground.

Reference is had to the accompanying drawings, which form a part of this specification, in which drawings like characters of reference indicate like parts in both the views, and in which—

Figure 1 is a side view representing a horse having harness to which my invention has been applied, and Fig. 2 is a perspective view of my invention detached from the harness.

Referring more particularly to the parts, 1 represents the collar, which constitutes a portion of the horse's harness, and this collar is of common construction. Near its lower portion the traces 2 attach and lead rearwardly, so as to connect with links 3, attaching to the swingletree 4. To the rear portion of the swingletree, near its middle, a draft line or cable 5 may attach, as shown.

With such a harness as I have described above when the pulling force is not being exerted the line 5 becomes slack and the swingletree 4 will fall upon the ground, as will be readily understood, so that as the animal advances the swingletree may be struck by the animal's hoofs or hocks. This is not desirable, as it may injure the animal and has a tendency to frighten it if it is timid.

My invention affords means for supporting the swingletree in a simple manner. In applying my invention I provide a pair of oppositely-disposed bars 6, which are arranged longitudinally at the sides of the animal and provided forwardly with eyes 7, which attach loosely to the collar 1, as shown, preferably at the same point of attachment as that for the traces 2. These bars 6 project along the animal's body and at their rear extremities are formed with vertically-elongated eyes 8, through which the traces 2 pass, as shown most clearly in Fig. 1. Upon the bodies of the bars 6 and preferably at substantially the points shown oppositely-disposed shackles 9 are provided, and to these attach an adjustable strap 10, passing up over the rump of the animal, as indicated. From this arrangement it follows that when the pulling force is not being exerted the strap 10 operates to support the side bars 6, and they in turn support the traces, in this manner maintaining the swingletree off of the ground. When in this condition, the parts of the harness would assume substantially the relation in which they are shown in Fig. 1. When the pulling force is being exerted, the line 5 and the traces of course will become taut. When in this condition, of course the swingletree will rise from the position in which it is shown in Fig. 1. The traces will also rise and carry with them the bars 6. The bars, however, offer no obstacle to the rise of the traces except a portion of their own weight, which is insignificant. When the harness is in this condition, the strap 10 will lie loosely over the horse's back. In rising and falling the traces pass freely through the eyes 8, as will be readily understood.

While I have represented my invention as applied to a single harness so as to support the swingletree and traces, it could also be as easily applied to a double harness or to harnesses of other kinds.

Having thus described my invention, I claim as new and desire to secure by Letters Patent—

1. A harness, in combination with horizontally-disposed bars, means for supporting said bars from a part of said harness, and means for supporting the traces of said harness from said bars.

2. In a harness, in combination, a collar, traces attaching thereto, bars, means for attaching the same forwardly, said bars projecting rearwardly and presenting eyes through which said traces pass, and a strap connecting said bars and passing over the animal's body.

3. In a harness, in combination, a collar, bars and traces attaching thereto and leading rearwardly therefrom, and means for guiding said traces freely through the rear extremities of said bars.

4. In a harness, in combination, a collar, traces, bars attaching thereto and leading rearwardly therefrom, said bars having eyes at the rear extremity thereof through which said traces pass, and an adjustable strap attaching to said bars and adapted to pass over the rump of the draft-animal.

In testimony whereof I have signed my name to this specification in the presence of two subscribing witnesses.

ROBERT LINCOLN NEWELL.

Witnesses:
L. D. KIRKPATRICK,
SARAH E. DAVIS.